US012488403B2

(12) United States Patent
Joyce

(10) Patent No.: US 12,488,403 B2
(45) Date of Patent: Dec. 2, 2025

(54) PATTERN MATCHING SYSTEM FOR AUTOMATED CADASTRAL EPOCH REFERENCE LAYER CONFLATION

(71) Applicant: NFOLDROI PRODUCTS PTY LTD, Melbourne (AU)

(72) Inventor: Paul Joyce, Melbourne (AU)

(73) Assignee: NFOLDROI PRODUCTS PTY LTD, Melbourne (AU)

( * ) Notice: Subject to any disclaimer, the term of this patent is extended or adjusted under 35 U.S.C. 154(b) by 242 days.

(21) Appl. No.: 18/041,294

(22) PCT Filed: Aug. 21, 2021

(86) PCT No.: PCT/AU2021/050930
§ 371 (c)(1),
(2) Date: Feb. 10, 2023

(87) PCT Pub. No.: WO2022/040727
PCT Pub. Date: Mar. 3, 2022

(65) Prior Publication Data
US 2023/0342870 A1    Oct. 26, 2023

(30) Foreign Application Priority Data
Aug. 28, 2020  (AU) ................................ 2020903075

(51) Int. Cl.
*G06F 17/00*  (2019.01)
*G06F 16/22*  (2019.01)
(Continued)

(52) U.S. Cl.
CPC ......... *G06Q 50/16* (2013.01); *G06F 16/2246* (2019.01); *G06F 16/29* (2019.01); *G06T 17/05* (2013.01)

(58) Field of Classification Search
CPC ..... G06Q 50/16; G06F 16/2246; G06F 16/29; G06F 18/22; G06F 18/24323;
(Continued)

(56) References Cited

U.S. PATENT DOCUMENTS 6,445,390 B1     9/2002  Aftosmis et al.
7,307,629 B2 *  12/2007  Srivastava .............. G06T 17/20
                                                                 345/419
(Continued)

OTHER PUBLICATIONS

Blasby D. et al., "GIS conflation using open source tools", OpenJump White Paper, 2004, sections 3.1.1, 3.1.2, 3.2.2, 3.3.3, figures 1-1, 3-4, tables 3-5.
(Continued)

*Primary Examiner* — Greta L Robinson
(74) *Attorney, Agent, or Firm* — INNOVATION CAPITAL LAW GROUP, LLP; Vic Lin

(57) ABSTRACT

A system for cadastral epoch conflation involving previous and subsequent cadastre epochs, each comprising a plurality of shapes calculates geometric characteristics for each polygon of each epoch, the geometric characteristics comprising at least one of area, perimeter, number of vertices, scale, orientation and irregularity, calculates geometric topologies for each epoch, the topology representing neighbour relationships of the polygons of each epoch, correlates pairs of polygons from the respective epochs according to the geometric characteristics and correlates remaining pairs of polygons from the respective epochs according to the geometric topologies.

18 Claims, 3 Drawing Sheets

(51) Int. Cl.
   *G06F 16/29* (2019.01)
   *G06Q 50/16* (2012.01)
   *G06T 17/05* (2011.01)
(58) Field of Classification Search
   CPC ..... G06F 2218/12; G06T 17/05; G06T 17/20; G06T 7/33; G06T 7/337; G06T 5/50; G06T 5/80; G06T 11/00; G06V 10/457; G06V 10/752; G06V 10/761; G06V 30/414; G06V 30/422; G06V 30/18076; G06V 30/19027; G01C 7/02; G06N 5/00
   See application file for complete search history.

(56) References Cited

U.S. PATENT DOCUMENTS

| | | | | |
|---|---|---|---|---|
| 7,908,579 | B2 * | 3/2011 | Irmatov | G06F 30/398 |
| | | | | 716/132 |
| 10,399,669 | B2 * | 9/2019 | Viennot | B64C 13/341 |
| 10,831,832 | B2 * | 11/2020 | Evseroff | H04W 4/022 |
| 11,442,997 | B2 * | 9/2022 | Evseroff | G06F 16/909 |
| 2006/0041375 | A1 | 2/2006 | Witmer et al. | |
| 2013/0325816 | A1 * | 12/2013 | Zeibak | G06F 16/21 |
| | | | | 707/688 |
| 2016/0005226 | A1 * | 1/2016 | Brown | G06T 17/205 |
| | | | | 345/419 |

OTHER PUBLICATIONS

International Search Report & Written Opinion dated Sep. 17, 2021 from PCT Application No. PCT/AU2021/050930.

Wu, J. et al., "A Matching Algorithm Based on Voronoi Diagram for Multi-Scale Polygonal Residential Areas", in IEEE Access, vol. 6, pp. 4904-4915, 2018 abstract, sec III.

Xia, X. et al. "Deep fully convolutional networks for cadastral boundary detection from UAVimages", Remote sensing. Jan. 2019;II(14):1725 abstract, sec. 3.2.1, table 1.

* cited by examiner

PATTERN MATCHING SYSTEM FOR AUTOMATED CADASTRAL EPOCH REFERENCE LAYER CONFLATION

FIELD OF THE INVENTION

This invention relates generally to a pattern matching system for automated cadastral epoch reference layer conflation.

BACKGROUND OF THE INVENTION

A cadastre is a comprehensive land recording of the real estate or real property's metes-and-bounds of a country.

Cadastral data may be periodically updated to account for subdivisions and consolidations, boundary adjustment and the like. For example, FIG. 3 shows exemplary previous and subsequent cadastral data epochs wherein shifting therebetween may be of the order of several metres. Organizations having used the older (dotted) cadastre to show the location of their assets need to move their assets when the underlying cadastre moves as their assets would otherwise be shown in the wrong locations.

Problematically however, differences between the two epochs may not be conformal or regular. For example, polygons may be moved, subdivided or consolidated, and/or deformed between each epoch. As such, finding the correlating pairs of polygons cannot involve simple equivalence testing.

As such, present reference layer conflation techniques involve manual digitisation of differences between the epochs wherein, for example, a human operator will use a pointer device to correlate vertices of each polygon on screen to digitise the transformations between the epochs. This is a time-consuming, expensive and inaccurate process.

Automated digitisation of these differences is desirous but however automated digitisation is difficult because computers are ill-equipped to 'intuitively' match polygons that have been deformed and/or subdivided or consolidated between epochs.

The present invention seeks to provide a way to overcome or substantially ameliorate at least some of the deficiencies of the previous art, or to at least provide an alternative.

It is to be understood that, if any previous art information is referred to herein, such reference does not constitute an admission that the information forms part of the common general knowledge in the art, in Australia or any other country.

SUMMARY OF THE DISCLOSURE

There is provided herein a pattern matching system for automated cadastral epoch conflation.

The system takes cadastral data of previous and subsequent epochs and performs digitisation and/or polygonisation if required.

The system calculates geometric characteristics for each polygon of each epoch. The geometric characteristics may comprise at least one of area, perimeter, number of vertices, scale, orientation, irregularity. Scale may be calculated as the average of the distances from centroid of a polygon to each vertex thereof, orientation may be calculated as a double integral of the second moment of inertia and irregularity may be calculated as angular deviation from a regular n-sided shape.

The system may generate a multi-dimensional R-Tree for each epoch using the geometric characteristics for fast searching of polygons according to one or more of the geometric characteristics.

The system further obtains or calculates geometric topologies for each epoch. The geometric topologies represent neighbour relationships of the polygons of each epochs and, in embodiments, represents directional relationships.

The system then correlates pairs of polygons from the respective epochs according to the geometric characteristics.

The system may correlate pair of polygons using a weighted fuzzy comparison of the geometric characteristics. The system may adjust for weightings to control for a number of matches and/or a number of false positives.

For any remaining pairs of polygons, the system correlates the remaining pairs of polygons according to the geometric topologies, including directionally.

The system may employ Voronoi tessellation, such as centroidal Voronoi tessellation to calculate adjustment vectors between correlated polygons which are used to adjust one or more reference layers.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
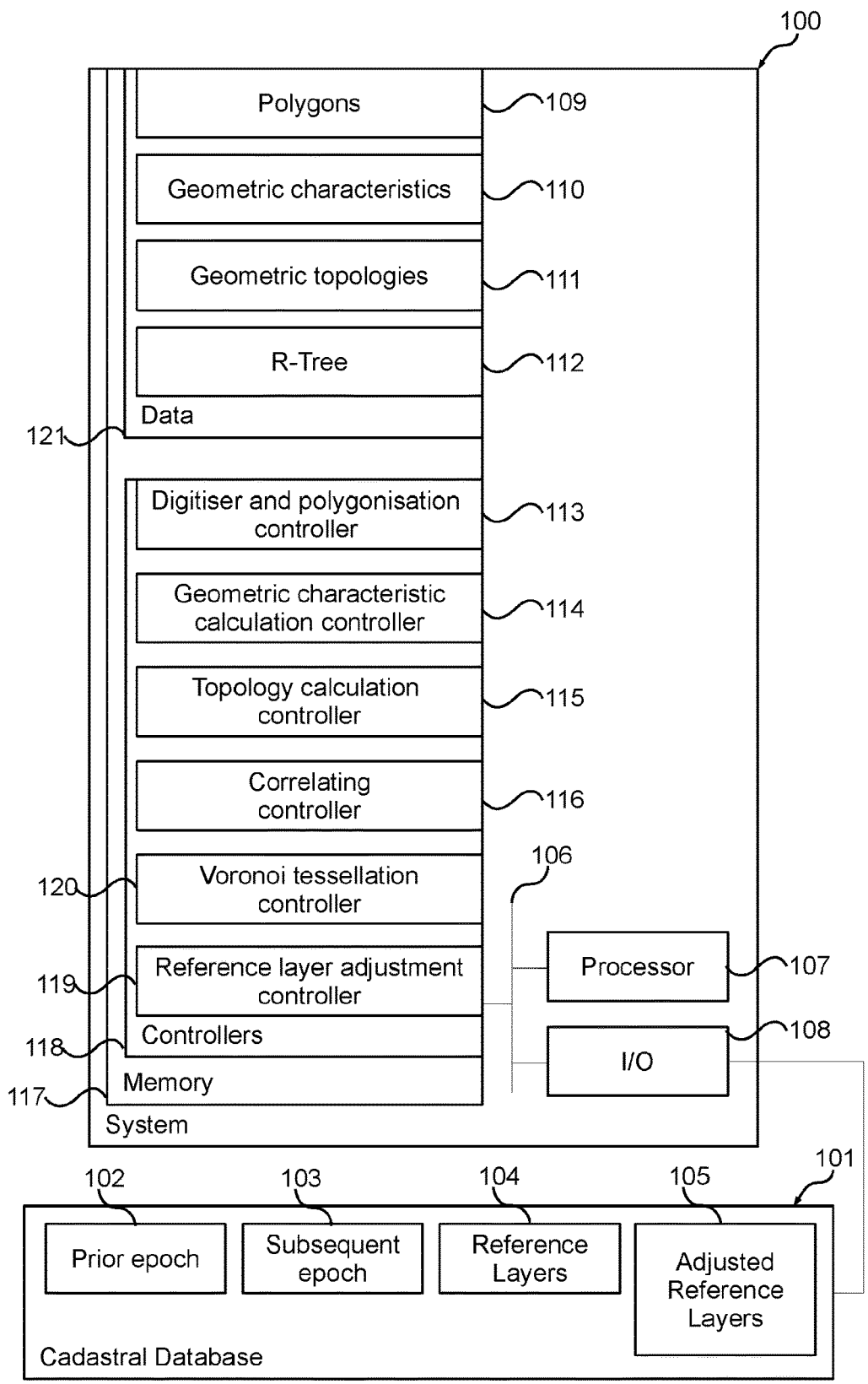
FIG. 1 shows an artificial Intelligence (AI) pattern matching system for automated cadastral epoch conflation in accordance with an embodiment.

FIG. 1 shows a system 100 for Artificial Intelligence (AI) pattern matching system for automated cadastral epoch reference layer conflation. The system 100 comprises a processor 107 for processing digital data. A memory device 117 is in operable communication with the processor 107 via a system bus. The memory device 117 is configured for storing digital data including computer program code instructions. In use, the processor 107 fetches these computer program code instructions and associated data 121 from the memory device 117 for interpretation and execution of the computational functionality divided herein.

The computer program code instructions may be logically divided into a plurality of controllers 118.

The system 100 may comprise an I/O interface 118 for obtaining cadastral data from a cadastral database 101. The cadastral database 101 may comprise a plurality of cadastral data epochs, including a previous epoch 102 and subsequent epoch 103.

The cadastral database 101 may further comprise one or more reference layers 102 such as representing services, utilities, assets and the like.

The controllers 118 may comprise a digitiser and polygonisation controller 113 which may digitise and/or modify the digital format of the cadastral data from the cadastral database 101 and which may calculate a plurality of polygons 109 in relation to each epoch 102, 103 if required.

The controllers 118 may further comprise a geometric characteristic calculation controller 114 which may generate a plurality of geometric characteristics 110 for the polygons 109 of each epoch 102, 103.

The controllers 118 may further comprise a topology calculation controller 115 which may calculate geometric topologies 111 of the polygons 109 of each epoch 102, 103. As will be described in further detail below, the geometric topologies 111 may represent neighbour or bounding relationships of polygons 109. The geometric topologies 111 may further represent directional relationships between polygons 109.

The controllers 118 may further comprise a correlation controller 116 which correlates matching pairs of polygons 109 within each epoch 102, 103 according to the geometric characteristics 110 and the geometric topologies 111.

The controllers 118 may generate an R-tree for multidimensional searching of the geometric characteristics 110, and, in embodiments, the geometric topologies 111.

The controllers 118 may further comprise a Voronoi tessellation controller 120 for performing Voronoi tessellation of the polygons 109 and a reference layer adjustment controller 118 which generates one or more adjusted reference layers 105 according to adjustment vectors determined from the Voronoi tessellation.

Figure 3:
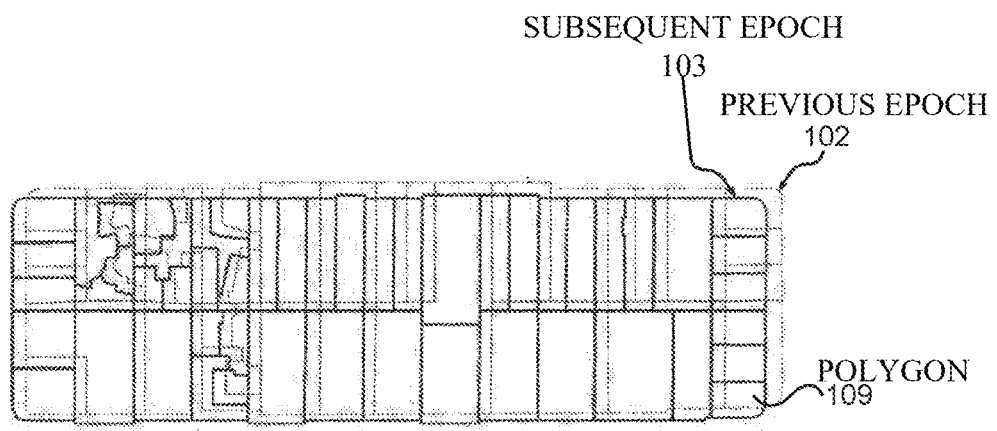
FIG. 3 shows exemplary cadastral data epochs.

FIG. 3 shows exemplary previous and subsequent epochs 102, 103 each comprising a plurality of polygons 109.

Figure 4:
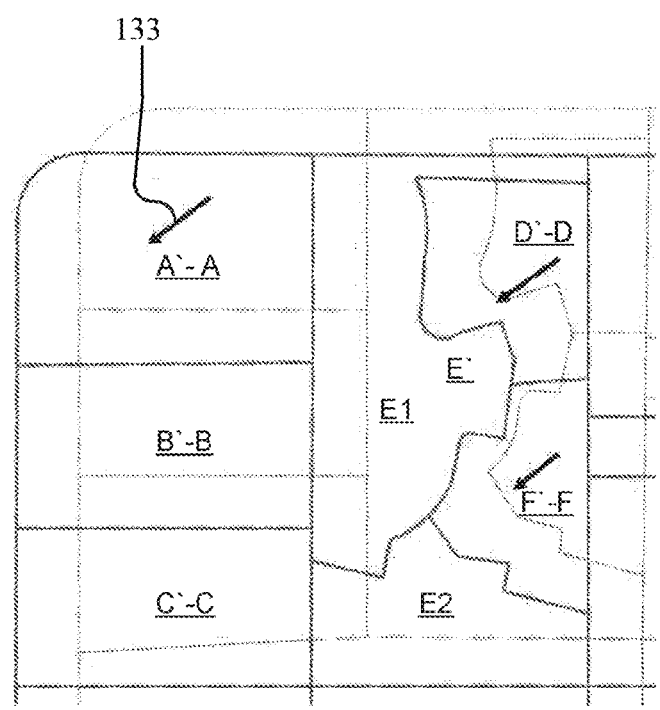
FIG. 4 shows a magnified view of the cadastral data epochs of FIG. 3.

FIG. 4 shows a magnified view of the top left-hand corner of the epochs 102, 103 of FIG. 3.

Figure 2:
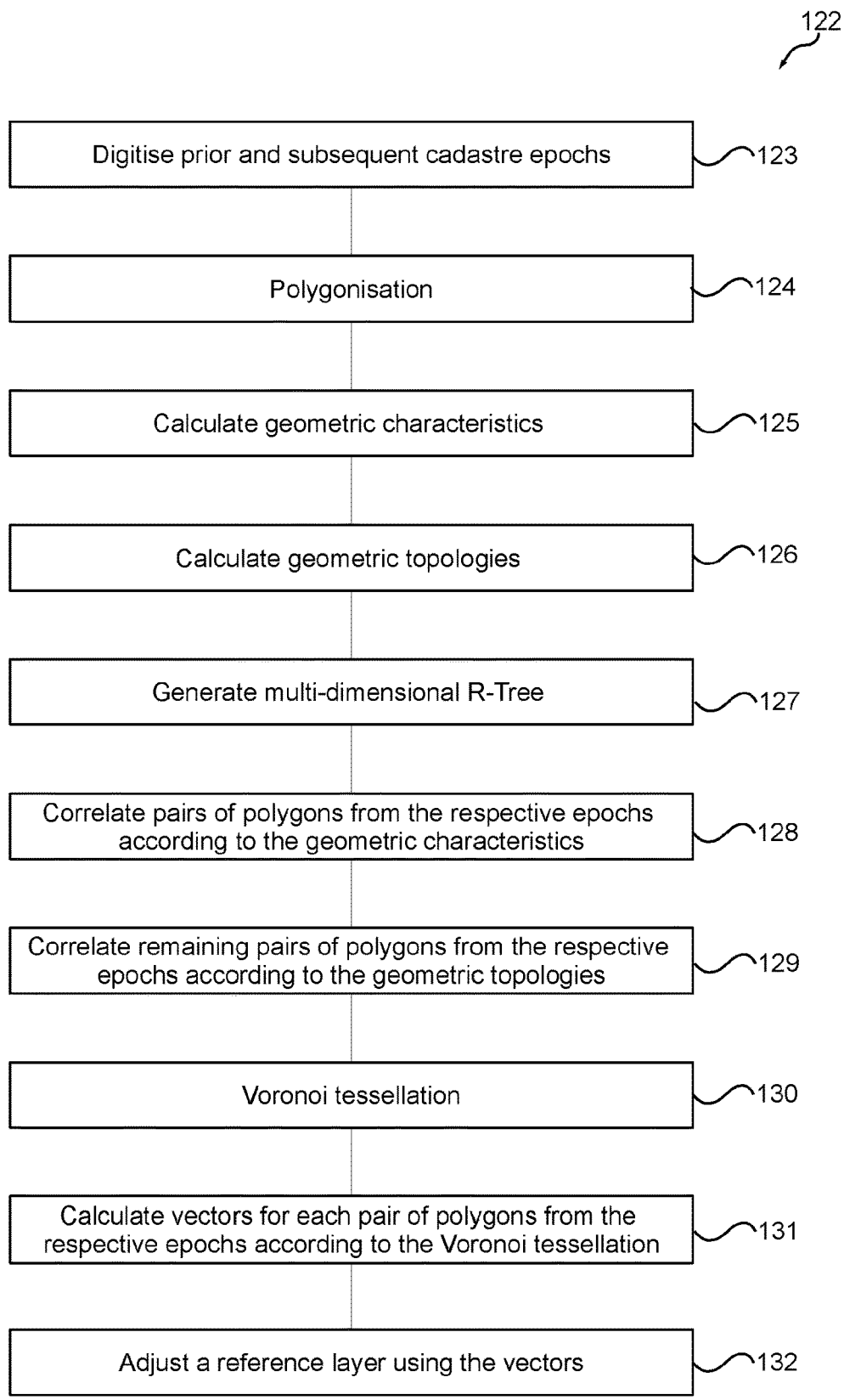
FIG. 2 shows exemplary processing by the system of FIG. 1.

Exemplary processing 112 of the system 100 is given in FIG. 2.

The processing 112 may comprise the digitiser and polygonisation controller 113 digitising the previous and subsequent cadastral epochs 102, 103 if required.

The processing 112 may comprise the digitiser and polygonisation controller 113 performing polygonisation using the previous and subsequent epoch 102, 103 to divide each epoch 102, 103 into a plurality of polygons 109 if required. With reference to FIG. 4, a polygon 109 of a previous epoch 102 is shown hyphenated whereas the subsequent epoch 103 is shown non-hyphenated. For example, the top left-hand polygons 109 of FIG. 4 shows the previous epoch polygon A' and the subsequent epoch polygon A.

Step 125 comprises the geometric characteristic calculation controller 114 calculating geometric characteristics 111 for each polygon 109 of each epoch 102, 103.

The geometric characteristics 111 may comprise at least one of area, perimeter, number of vertices, scale, orientation and irregularity of each polygon.

Scale may be calculated as the average of the distances from centroid of a polygon to each vertex thereof.

Orientation may be calculated as a double integral of the second moment of inertia.

Irregularity may be correlated as angular deviation from a regular n-sided shape.

In a preferred embodiment, the geometric characteristic calculation controller 114 calculate all of area, perimeter, number of vertices, scale, orientation and irregularity of each polygon.

These geometric characteristics 110 may be stored within the data 121.

The R-Tree 112 may be generated at step 127 according to the geometric characteristics 110 for fast multi-dimensional searching. For example, the R-Tree 112 may be searched to find polygons 109 by one or more of area, perimeter, number of vertices, scale, orientation and irregularity.

At step 126, the topology calculation controller 115 may calculate geometric topologies 111 for the epoch 102, 103. The geometric topologies 111 represent neighbour/bounding relationships of the polygons of each epoch 102, 103.

In embodiments, the R-tree 112 may be further updated according to the geometric topologies 111 so that neighbours of a polygon 109 may be quickly found.

At step 128, the correlation controller 116 correlates pairs of polygons from the respective epoch 102, 103 according to the geometric characteristics 128.

In embodiments, the correlation controller 116 uses a weighted fuzzy comparison of the geometric characteristics 110. The correlation controller 116 may adjust fuzzy weightings to control a number of matches and all a number of false positives.

With reference to FIG. 4, distinctly shaped polygons A, D and F are correlated in this way by the correlation controller 116 as shown by correlation arrow 133. However, less distinctively shaped remaining polygons B and C are not matched. Furthermore, polygon E' from the previous epoch 102 has been subdivided into two polygons E1 and E2 of the subsequent epoch 103 which are therefore similarly not matched.

As such, at step 129, the correlation controller 116 correlates remaining pairs of the polygons 109 from the respective epoch 102, 103 according to the geometric topologies 111.

For example, indistinctive remaining polygons B' and B are correlated by virtue of their adjacency to matched polygons A' and A. In embodiments, the correlation controller 116 may further match adjacent polygons 109 directionally wherein, for example, polygons B and B are matched by virtue of their being southerly of matched polygons A' and A as compared to easterly polygons E' and E1.

Furthermore, polygons E1 and E2 may be correlated to previous epoch polygon E' by virtue of adjacency and area. For example, the sum of the area of E1 and E2 may be determined by the correlation controller 116 as being approximately that of polygon E'.

Step 130 may comprise the Voronoi tessellation, such as centroidal Voronoi tessellation to calculate adjustment vectors 113 between polygon centroids for each correlated pair of polygons 109. Each vector 113 may comprise a magnitude and direction.

At step 130, the reference layers 104 may be adjusted according to the adjustment vectors to generate adjusted reference layers 105.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. An Artificial Intelligence (AI) pattern matching system for cadastral epoch conflation involving previous and subsequent cadastre epochs, each comprising a plurality of shapes, wherein the Artificial Intelligence (AI) pattern matching system:
   calculates geometric characteristics for each polygon of each epoch, the geometric characteristics comprising at least one of area, perimeter, number of vertices, scale, orientation and irregularity,
   calculates geometric topologies for each epoch, the topology representing neighbour relationships of the polygons of each epoch,
   correlates pairs of polygons from the respective epochs according to the geometric characteristics, and correlates remaining pairs of polygons from the respective epochs according to the geometric topologies,
   wherein the Artificial Intelligence (AI) pattern matching system correlates pairs of polygons from the respective epochs according to the geometric characteristics using a weighted fuzzy comparison of the geometric characteristics.

2. The Artificial Intelligence (AI) pattern matching system as claimed in claim 1, wherein the Artificial Intelligence (AI) pattern matching system further performs Voronoi tessellation to calculate adjustment vectors for each correlated pair of polygons from the respective epochs and adjust a reference layer using the vectors.

3. The Artificial Intelligence (AI) pattern matching system as claimed in claim 2, wherein the Voronoi tessellation is centroidal Voronoi tessellation.

4. The Artificial Intelligence (AI) pattern matching system as claimed in claim 1, further comprising the Artificial Intelligence (AI) pattern matching system adjusting for the weightings to control a number of matches and a number of false positives.

5. The Artificial Intelligence (AI) pattern matching system as claimed in claim 1, further comprising the Artificial Intelligence (AI) pattern matching system generating a multi-dimensional R-Tree for each epoch using the geometric characteristics.

6. The Artificial Intelligence (AI) pattern matching system as claimed in claim 5, wherein the Artificial Intelligence (AI) pattern matching system correlating pairs of polygons from the respective epochs according to the geometric characteristics comprises searching the R-Tree for polygons according to one or more of the geometric characteristics.

7. The Artificial Intelligence (AI) pattern matching system as claimed in claim 1, wherein the geometric characteristics comprises all of area, perimeter, number of vertices, scale, orientation, irregularity.

8. The Artificial Intelligence (AI) pattern matching system as claimed in claim 1, wherein the Artificial Intelligence (AI) pattern matching system calculates scale as an average of the distances from centroid to each vertex.

9. The Artificial Intelligence (AI) pattern matching system as claimed in claim 1, wherein the Artificial Intelligence (AI) pattern matching system calculates orientation as a double integral of a second moment of inertia.

10. The Artificial Intelligence (AI) pattern matching system as claimed in claim 1, wherein the Artificial Intelligence (AI) pattern matching system calculates irregularity as an angular deviation from a regular n-sided shape.

11. An Artificial Intelligence (AI) pattern matching system for cadastral epoch conflation involving previous and subsequent cadastre epochs, each comprising a plurality of shapes, wherein the Artificial Intelligence (AI) pattern matching system:
   calculates geometric characteristics for each polygon of each epoch, the geometric characteristics comprising at least one of area, perimeter, number of vertices, scale, orientation and irregularity,
   calculates geometric topologies for each epoch, the topology representing neighbour relationships of the polygons of each epoch,
   correlates pairs of polygons from the respective epochs according to the geometric characteristics, and
   correlates remaining pairs of polygons from the respective epochs according to the geometric topologies,
   wherein the Artificial Intelligence (AI) pattern matching system correlating pairs of polygons from the respective epoch according to the geometric topologies comprises the Artificial Intelligence (AI) pattern matching system further correlating pairs of polygons directionally.

12. The Artificial Intelligence (AI) pattern matching system as claimed in claim 11, further comprising the Artificial Intelligence (AI) pattern matching system generating a multi-dimensional R-Tree for each epoch using the geometric characteristics.

13. The Artificial Intelligence (AI) pattern matching system as claimed in claim 11, wherein the geometric characteristics comprises all of area, perimeter, number of vertices, scale, orientation, irregularity.

14. The Artificial Intelligence (AI) pattern matching system as claimed in claim 11, wherein the Artificial Intelligence (AI) pattern matching system calculates orientation as a double integral of a second moment of inertia.

15. The Artificial Intelligence (AI) pattern matching system as claimed in claim 11, wherein the Artificial Intelligence (AI) pattern matching system calculates irregularity as an angular deviation from a regular n-sided shape.

16. An Artificial Intelligence (AI) pattern matching system for cadastral epoch conflation involving previous and subsequent cadastre epochs, each comprising a plurality of shapes, wherein the Artificial Intelligence (AI) pattern matching system:
   calculates geometric characteristics for each polygon of each epoch, the geometric characteristics comprising at least one of area, perimeter, number of vertices, scale, orientation and irregularity,
   calculates geometric topologies for each epoch, the topology representing neighbour relationships of the polygons of each epoch,
   correlates pairs of polygons from the respective epochs according to the geometric characteristics, and
   correlates remaining pairs of polygons from the respective epochs according to the geometric topologies,
   wherein the Artificial Intelligence (AI) pattern matching system correlating pairs of polygons from the respective epoch further comprises the Artificial Intelligence (AI) pattern matching system correlating subdivided or combined polygons according to area thereof between the respective epochs.

17. The Artificial Intelligence (AI) pattern matching system as claimed in claim 16, further comprising the Artificial Intelligence (AI) pattern matching system generating a multi-dimensional R-Tree for each epoch using the geometric characteristics.

18. The Artificial Intelligence (AI) pattern matching system as claimed in claim 16, wherein the geometric characteristics comprises all of area, perimeter, number of vertices, scale, orientation, irregularity.

* * * * *